3,463,676
COMPOSITION OF STOP-WELD MATERIAL FOR ROLL-BOND
John E. Higgins, Cottage Hills, Ill., assignor to Olin Mathieson Chemical Corporation, a corporation of Virginia
No Drawing. Filed Sept. 13, 1967, Ser. No. 667,351
Int. Cl. C23c 1/12
U.S. Cl. 148—22         6 Claims

ABSTRACT OF THE DISCLOSURE

A composition of stop-weld has been developed which is particularly effective for production of copper, Roll-Bond® (Roll-Bond is a registered trademark of Olin Mathieson Chemical Corp.). The composition contains about 16 to 41% of the sum of $TiO_2$ and BN, the BN being at least 40% of said sum, from 0.5% to 5.0% by weight bentonite, from 0.10% to 4% magnesium montmorillonite, balance water. 0.1% to 10% by weight $SiO_2$ can also be added.

---

The present invention relates to weld arresting or stop-weld compositions used to create weld-free zones in metal fabricating operations.

During the cold or hot autogenous welding of two metals (pressure or roll welding), subsequent fabrication steps may necessitate the creation of weld-free zones. These weld-free zones are generally formed by interposing between the metals a substance called a weld arrester or stop-weld material.

Following the welding operation, the unwelded parts may be subjected to an internal pressure by the use of a fluid under pressure to move apart the metal adjacent the unwelded or weld-free zones. This procedure permits the convenient fabrication of articles, such as heat exchangers, with the article being characterized as an integral metal sheet containing passages internally, thereof.

The commonly used stop-weld material is lamellar graphite. This material is conventionally applied to the surface of the metal in the desired pattern by means of a silk or nylon screening operation. The foregoing operation requires that the stop-weld material possess certain physical properties. The morphology and crystal structure of the material must favor easy extrusion and deposition of the stop-weld through the openings in the silk or nylon screen under the shearing of a manually applied squeegee. In addition, the stop-weld material must have sufficient adherence to the metal so that upon removal of the screen, it does not lift up with the screen leaving uncoated metal in the patterned areas.

Furthermore, the layer of stop-weld material must be uniformly deposited, completely cover the desired surface areas, fill corners and produce straight edges where this is required.

Further characteristics of a successful stop-weld material is that layer of stop-weld deposited on the metal must not spall or crack under low temperature drying conditions. When heated in the furnace at elevated temperatures prior to subsequent bonding and fabrication practices, the stop-weld must extend under rolling reduction pressure in such a manner that complete pattern coverage is maintained, providing optimum weld arresting at the patterned interface.

As can be recognized, the foregoing represents numerous and severe requirements in a stop-weld material. Graphitic base stop-weld material fulfills all of the foregoing requirements. However, for some uses of the integral material containing weld-free zones, a need exists for a stop-weld or weld arresting material which, in addition, to the foregoing attributes is galvanically neutral with respect to aluminum and copper in aqueous environments. Graphite is an undesirable element in a weld arresting material from the corrosion standpoint, especially in aqueous environments. Graphite is a strong cathodic depolarizer and under aqueous conditions in the presence of aluminum and copper tends to accelerate the electrochemical processes leading to failure by preferential corrosion pitting. Furthermore, despite special cleaning techniques, there is no practical method of removing all traces of graphite stop-weld from the integral welded material.

In U.S. application S.N. 518,713 now U.S. Patent Number 3,385,716 a composition of stop-weld material is described which is particularly effective in processing aluminum and aluminum alloys. This composition contains 5% to 60% by weight $TiO_2$, 0.5% to 5.0% by weight bentonite, from 0.10% to 4% by weight magnesium montmorillonite and the balance essentially water. Preferably, the composition additionally contains 0.1% to 10% by weight $SiO_2$.

It has been found that this composition is not particularly effective in processing copper and copper alloys.

Accordingly, it is an object of the present invention to develop a novel weld arresting material.

It is a principal object of the present invention to develop a suitable stop-weld material which satisfies the numerous and severe requirements for an acceptable stop-weld material, and, in addition, is galvanically neutral with respect to copper, especially in aqueous environments.

It is a further object of the present invention to provide a novel weld arresting material as aforesaid which is relatively inexpensive and readily utilizable on a commercial scale.

It is a further object of the invention to provide a composition which is an effective weld arresting material in the processing of copper and copper alloys.

Further objects and advantages of the present invention will be apparent from the ensuing discussion.

In accordance with the present invention, it has now been found that the foregoing objects and advantages may be readily attained and a novel weld arresting material provided.

The novel weld arresting material of the present invention comprises an aqueous suspension containing from about 16 to about 41% by weight of the sum of titanium dioxide and boron nitride, from 0.5% to 5.0% by weight of bentonite, from 0.10% to 4% by weight of magnesium montmorillonite, and the balance essentially water. Still further improvements can be obtained by adding, in addition, to the foregoing from 0.1% to 10% by weight of silicon dioxide.

The boron nitride which is the principle ingredient difference of the present composition over that described in S.N. 518,713 now U.S. Patent Number 3,385,716 is used in an amount from at least 40% by weight of the $TiO_2$ content and preferably at least 50% by weight. However, it is not advantageous to use more than about 50% BN because additions above 50% do not give significantly improved results and the cost of BN dictates the use of no more BN then necessary. Boron nitride is an excellent lubricant at high temperatures. The lubricating property of boron nitride at high temperatures improves the flow characteristics during the Roll-Bonding operation increasing the effectiveness of the stop-weld. This is particularly true in regard to copper Roll-Bond where the very high temperatures (1600° F. to 1800° F.) and high reductions are used (65%).

Preferably, a water dispersible titanium dioxide should be used. The titanium dioxide can be dispersed in water to form a paste which can be screened; however, such a mixture is not ideally suited for screening operations because of rapid drying and, hence, loading of the screen. In addition, stop-weld patterns produced with titanium dioxide-water dispersions alone spall during drying and preheat cycles prior to the bonding operation.

To eliminate this problem, bentonite is dry blended with the titanium dioxide and boron nitride prior to mixing with water. The bentonite is used in an amount from 0.5% to 5% and, preferably, from 1% to 3%. Bentonite is essentially a hydrophilic material which acts as a filler.

If the stop-weld material contains less than 0.5% bentonite, the stop-weld spalls on drying, especially in heat. If over 5% of bentonite is present, the cracking pressure of the stop-weld increases rapidly, thereby, degrading weld-arresting ability.

To further improve the plasticity of the stop-weld mix magnesium montmorillonite is added in an amount from 0.10% to 4% by weight and, preferably, from 0.25% to 1.5% by weight. This material acts as a gelling agent similar to gelatins and gum material and yet is inorganic, contains no carbon and is not subject to microbiological degradation. In addition, the magnesium montmorillonite controls the pH stability during storage of the stop-weld paste.

A preferred form of magnesium montmorillonite is "Ben-A-Gel" a trademark of the National Lead Company for a highly beneficiated magnesium montmorillonite.

The magnesium montmorillonite component of the stop-weld of the present invention is, preferably, prepared in the form of a premixed gel containing the desired amount of magnesium montmorillonite and the balance water mixed in any high shear stirring device. The dry, premixed titanium dioxide-boron-nitride-bentonite component may be simply added to the gel or the gel may be mixed with the titanium dioxide-boron-nitride-bentonite component in a high shear stirring device. Additional make-up water may be added as desired.

In developing an optimum stop-weld formulation, it has been found that it is difficult to consistently produce uniform batches of material due to the inherent tendency of titanium dioxide to flocculate, especially in dry mixing the ingredients.

However, it has been found that by incorporating small amounts of silica, especially colloidal silica, with the dry ingredients a more homogeneous blend is achieved which provides optimum uniformity in the stop-weld performance. In general, 0.10% to 10% by weight of silica is utilized and, preferably, from 0.1% to 1%.

Naturally, additional additives may be incorporated with the stop-weld of the present invention, for example, talc, kaolin, magnesium oxide, and so forth.

It has been found, in addition, that the stop-weld material of the present invention should, preferably, have a viscosity in the range of from 32,000 to 50,000 cps. apparent viscosity at 72° F.

The mproved stop-weld composition of the present invention is particularly valuable in since it provides the only known means of producing copper Roll-Bond® with a non-graphic stop-weld.

The advantage of the improved material of the present invention over other known materials is that it contains no graphite, carbon, or other organic compounds, and it is chemically inert in aqueous solutions. This property enables a copper Roll-Bond® tube to perform in carrying aqueous solutions with about the same resistance to corrosion as the metal uncoated.

Desalinization applications, transformer cooler plates and similar applications provide a considerable market for copper Roll-Bond® with improved corrosion resistance.

The present invention will be more readily understandable from a consideration of the following illustrative examples.

Example I

A stop-weld composition was prepared having the following ingredients:

| | Percent by weight |
|---|---|
| Titanium dioxide AWD | 15.6 |
| Boron nitride | 15.6 |
| Bentonite B1–50 grade | 1.56 |
| Ben-A-Gel EW grade | 0.33 |
| Colloidal silica | 0.6 |
| Distilled water | Balance |

The mixing procedure used involves a three-step operation.

A. Initially, a 1% Ben-A-Gel EW master batch pre-gel was prepared by gradual incorporation of dry Ben-A-Gel EW powder into a measured volume of distilled water, using a Waring Blendor operating at a constant high shear stirring rate of 10 minutes.

B. The titanium dioxide AWD, Bentonite B1–50 and Colloidal BN materials were dry blended by hand for 5 minutes.

C. The Ben-A-Gel EW was then gradually incorporated into the dry solids mixture manually for about 2 to 5 minutes. In addition, 300 cc. of distilled water were gradually blended into this paste, manually, for about 2 to 5 minutes.

D. This mixture was then stirred on a Cowles dissolver at 2000 r.p.m. for 10 minutes.

After this procedure, the stop-weld composition was ready for use. The above specific composition was used in Plate No.'s 1 and 2 as described in Example III.

Example II

Three batches of white stop-weld were made containing 3.1%, 13.8%, and 24.3% boron nitride according to the procedure described in Example I. These percentages are based on total weight of $TiO_2$ and not total weight of the batch.

Two alloy 122 copper plates were then patterned with each batch. One plate was rolled at approximately 35% hot roll reduction and one plate at approximately 50% reduction. Plate heating temperatures were 1800° F. After rolling and annealing at 900° F., the six plates were opened on the 45° shear and inflated.

One plate could not be opened at the 45° shear and one plate did not inflate at the press. Both of these plates were patterned with the 3.1% boron nitride mixture.

The remaining four plates were inflated and examined for stickers. Stickers were observed indicating that higher percentages of boron nitride were required.

Example III

Two alloy 122 copper plates were patterned with boron nitride mixtures of 50%, 40% and 35% boron nitride for a total of six (6) plates according to the procedure described in Example I. These six plates were then hot rolled at approximately 65% reduction and identified, with respect to stop-weld mixture by number. Plates #1 and 2 contained 50% BN, #3 and 4 contained 40%, and #5 and 6 contained 35%.

The plates were then picked and cold rolled. The plates received the standard anneal for 122 copper consisting of two (2) hours soak time at 900° F. and were inflated at 2000–2500 p.s.i. on a 600 ton press.

The plates were examined after inflation for evidence of sticking or peeling and then burst tested one plate from each group.

The results obtained were as follows:

(1) All plates were opened without difficulty.

(2) Plate #4 had one large sticker attributed to patterning. The plates patterned with 35% and 40% boron nitride illustrated evidence of sticking during the initial stages of inflation, but during the later stages of inflation, the stickers had released resulting in small creases in the waffle areas.

(3) The plates patterned with 50% boron nitride had no creasing other than that inherent to the design.

(4) Burst pressures of 850 p.s.i. were obtained for all three groups without peeling.

It is to be understood that the invention is not limited to the illustrations described and shown herein which are deemed to be merely illustrative of the best modes of carrying out the invention, and which are susceptible of modifications of form, size, arrangement of parts and detail of operation, but rather is intended to encompass all such modifications which are within the spirit and scope of the invention as set forth in the appended claims.

What is claimed is:

1. A weld arresting composition consisting essentially of an aqueous suspension containing from about 16 to 41% by weight of the sum of titanium dioxide and boron nitride, boron nitride being present at least 40% by weight of titanium dioxide from 0.5% to 5% by weight bentonite, from 0.10% to 4% by weight magnesium montmorillonite, and the balance essentially water.

2. A composition according to claim 1 containing from 0.1% to 10% by weight silicon dioxide.

3. A composition according to claim 2 wherein said boron nitride is present in an amount of at least 50% based on the weight of titanium dioxide.

4. A composition according to claim 2 wherein said bentonite is present in an amount from 1% to 3%.

5. A composition according to claim 2 wherein said magnesium montmorillonite is present in an amount from 0.25% to 1.5%.

6. A composition according to claim 2 wherein said silicon dioxide is colloidal silica in an amount from 0.1% to 1.0%.

References Cited
UNITED STATES PATENTS

| | | | |
|---|---|---|---|
| 2,343,158 | 2/1944 | Scott | 106—2 |
| 3,385,716 | 5/1968 | Jagaciak et al. | 106—2 |

L. DEWAYNE RUTLEDGE, Primary Examiner

T. R. FRYE, Assistant Examiner

U.S. Cl. X.R.

106—2, 286; 148—26; 252—313